(12) United States Patent
Chow

(10) Patent No.: US 7,609,634 B2
(45) Date of Patent: Oct. 27, 2009

(54) COMMUNICATION TRAFFIC POLICING APPARATUS AND METHODS

(75) Inventor: Joey M. W. Chow, Nepean (CA)

(73) Assignee: Alcatel Lucent, Paris (FR)

( * ) Notice: Subject to any disclaimer, the term of this patent is extended or adjusted under 35 U.S.C. 154(b) by 757 days.

(21) Appl. No.: 11/086,535

(22) Filed: Mar. 22, 2005

(65) Prior Publication Data

US 2006/0215558 A1    Sep. 28, 2006

(51) Int. Cl.
H04L 12/26 (2006.01)
(52) U.S. Cl. ............... 370/232; 370/230; 370/235.1; 370/468
(58) Field of Classification Search ......... 370/229–235, 370/235.1, 252, 253, 464, 465, 466, 468; 709/206, 223, 232, 233, 235
See application file for complete search history.

(56) References Cited

U.S. PATENT DOCUMENTS

| | | | | |
|---|---|---|---|---|
| 5,274,644 | A * | 12/1993 | Berger et al. | 370/230 |
| 6,011,775 | A * | 1/2000 | Bonomi et al. | 370/230 |
| 6,215,768 | B1 * | 4/2001 | Kim | 370/230 |
| 6,658,457 | B2 * | 12/2003 | Nishikawa et al. | 709/206 |
| 7,327,682 | B2 * | 2/2008 | Gandhi et al. | 370/235.1 |
| 7,340,529 | B1 * | 3/2008 | Yazaki et al. | 709/232 |
| 7,388,837 | B1 * | 6/2008 | St-Denis et al. | 370/235 |
| 2004/0008625 | A1 | 1/2004 | Lee et al. | |
| 2005/0025158 | A1 | 2/2005 | Ishikawa et al. | |
| 2005/0138254 | A1 * | 6/2005 | Raghavan et al. | 710/240 |
| 2005/0138621 | A1 * | 6/2005 | Clark et al. | 718/100 |
| 2005/0174944 | A1 * | 8/2005 | Legault et al. | 370/235.1 |
| 2006/0176818 | A1 * | 8/2006 | Olsen et al. | 370/235 |
| 2006/0203721 | A1 * | 9/2006 | Hsieh et al. | 370/229 |
| 2007/0058548 | A1 * | 3/2007 | Babonneau et al. | 370/235.1 |

OTHER PUBLICATIONS

Sheng-Lin Wu et al., "The Token-Bank Leaky Bucket Mechanism for Group Connections in ATM Networks", Network Protocols, 1996. Proceedings., 1996 International Conference on Columbus, Ohio, USA, Oct. 29-Nov. 1, 1996, Los Alamitos, California, USA, IEEE Comput. Soc., US, Oct. 29, 1996, pp. 226-233, XP010204437, ISBN: 0-8186-7453-9.

* cited by examiner

*Primary Examiner*—Kwang B Yao
*Assistant Examiner*—Nguyen Ngo
(74) *Attorney, Agent, or Firm*—Smart & Biggar

(57) ABSTRACT

Communication traffic policing apparatus and methods are disclosed. Communication traffic restrictions for each communication link in a group of communication links are enforced by allowing transfer of communication traffic associated with respective communication links of the group at transfer rates up to respective per-link transfer rates. In a group enforcement stage, transfer of additional communication traffic associated with a communication link of the group, above the per-link transfer rate for the communication link, is allowed where a combined transfer rate of communication traffic associated with another communication link of the group and the additional communication traffic would not exceed the per-link transfer rate for the other communication link. Thus, one or more individual communication links of a group may be allowed to effectively exceed their per-link transfer rates if one or more other communication links of the group have sufficient spare capacity.

18 Claims, 5 Drawing Sheets

COMMUNICATION TRAFFIC POLICING APPARATUS AND METHODS

FIELD OF THE INVENTION

This invention relates generally to communications and, in particular, to policing communication traffic transfer in a communication system.

BACKGROUND

In typical communication networks, physical or logical connections into the network have Service Level Agreements (SLAs) defining various parameters of communication service, usually in terms of communication bandwidth allocation. A customer having multiple network connections pays for each SLA and by doing so, is in effect paying for an aggregate amount of bandwidth. Due to the bursty nature of Internet Protocol (IP) and other types of communication traffic, however, there are often times during which some of a customer's connections exceed their respective allocated bandwidths, while others are operating below their allocations.

Communication networks normally use policing algorithms to enforce SLAs. Connections are individually policed and cannot share unused bandwidth with other policed connections. When a connection is in excess of its predetermined bandwidth, as in the above example, its communication traffic is negatively affected by either being discarded or marked for later discarding. Even though a customer is paying for an aggregate amount of bandwidth, any unused bandwidth on one connection cannot be used by any of its other connections.

Conventional "leaky bucket" policing algorithms are illustrative of per-connection policing, in which individual connections are policed for bandwidth usage. These methods operate on individual connections, and thus do not share unused bandwidth between connections.

Although sophisticated buffer management and scheduling algorithms may be used in an attempt to share excess bandwidth between connections, these techniques tend to be complex and costly, and operate on communication traffic which has already been processed by a policing function. In addition, these techniques share excess bandwidth between not only a customer's connections, but also connections of other customers as well. Customers therefore cannot be guaranteed that they will get their fair share of purchased but unused bandwidth.

Accordingly, there remains a need for policing techniques which enforce per-connection restrictions for a group of connections while allowing excess resource sharing within the group.

SUMMARY OF THE INVENTION

Embodiments of the present invention provide techniques for effectively reallocating bandwidth which is currently unused on one connection to communication traffic associated with other connections of a common customer or group, thereby allowing a customer to maximize aggregate bandwidth usage.

Each connection may be policed according to per-connection SLAs, with unused bandwidth being shared between policed connections in accordance with embodiments of the invention. Excess bandwidth available to one or more connections in a group is thereby effectively made available to other connections in the same group which require additional bandwidth. Communication traffic which would normally be discarded due to overloading on the other connections is then not negatively impacted through a network.

Sharing of unused resources in this manner allows communication service providers to make enhanced service offerings available and provide higher value to customers through potentially higher overall communication traffic throughput.

According to an aspect of the invention, an apparatus for enforcing communication traffic restrictions for a group of communication links is provided. The apparatus includes a communication traffic policing module which is configured to allow transfer of communication traffic associated with respective communication links of the group at transfer rates up to respective per-link transfer rates for the communication links. The communication traffic policing module also allows transfer of additional communication traffic associated with a communication link of the group, above the per-link transfer rate for the communication link, where a combined transfer rate of communication traffic associated with another communication link of the group and the additional communication traffic would not exceed the per-link transfer rate for the other communication link.

In one embodiment, the communication traffic policing module is implemented using a processor.

Communication traffic associated with a communication link may include communication traffic which is received on the communication link and/or communication traffic which is to be transmitted on the communication link.

The per-link transfer rate for each communication link may include at least one of a peak communication traffic rate and a sustained communication traffic rate. If each per-link transfer rate includes both peak and sustained communication traffic rates, the communication traffic policing module is configured to allow transfer of communication traffic which conforms to the peak and sustained communication traffic rates of the communication link with which the communication traffic is associated.

The communication traffic may include transmission data units, in which case the communication traffic policing module may be configured to allow transfer of communication traffic by assigning tokens to the transmission data units of the communication traffic.

Configuration of multiple communication links to form the group may be accomplished through an operator interface.

In some embodiments, the communication traffic policing module is further configured to select, from multiple communication links of the group, the communication link for which to allow the transfer of the additional communication traffic.

A method of policing a group of communication links is also provided, and includes allowing transfer of communication traffic associated with respective communication links of the group at transfer rates up to respective per-link transfer rates for the communication links, and allowing transfer of additional communication traffic associated with a communication link of the group, above the per-link transfer rate for the communication link, where a combined transfer rate of communication traffic associated with another communication link of the group and the additional communication traffic would not exceed the per-link transfer rate for the other communication link.

Another aspect of the invention provides a communication device which includes communication link interfaces for connection to multiple communication links and a policing module for applying a multi-stage policing scheme to control transfer of communication traffic associated with a group of at least a subset of the communication links. The multi-stage policing scheme includes a per-link policing stage for enforcing respective per-link communication traffic characteristics of the communication links of the group and a group policing stage for enforcing an aggregate communication traffic characteristics of the group.

In one embodiment, the policing module applies the multi-stage policing scheme according to a multi-level leaky bucket technique which incorporates respective per-link leaky buckets configured to drain into a group leaky bucket. The per-link communication traffic characteristics may include peak and/or sustained communication traffic rates. In this case, the per-link leaky buckets preferably include respective leaky buckets for enforcing the peak and/or sustained communication traffic rates of each of the communication links of the group.

The communication device may also include timers, operatively coupled to the policing module, for providing timing indications. The policing module may then be configured to enforce at least the per-link communication traffic restrictions by comparing timing indications provided by the timers to determine whether communication traffic associated with each of the communication links of the group conforms to the per-link communication traffic characteristic of the communication link.

The policing module may have an active role in communication traffic transfer, and be further configured to transfer communication traffic which satisfies the per-link or group communication traffic characteristics between the communication link interfaces.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

As briefly described above, conventional per-connection communication traffic policing techniques may lead to situations in which an overall aggregated amount of bandwidth purchased by a customer is not actually available to that customer. In accordance with embodiments of the invention, unused bandwidth on any of a customer's connections may be shared with other connections of that customer, thereby providing for potentially higher overall traffic throughput and better usage of overall purchased bandwidth.

Figure 1:
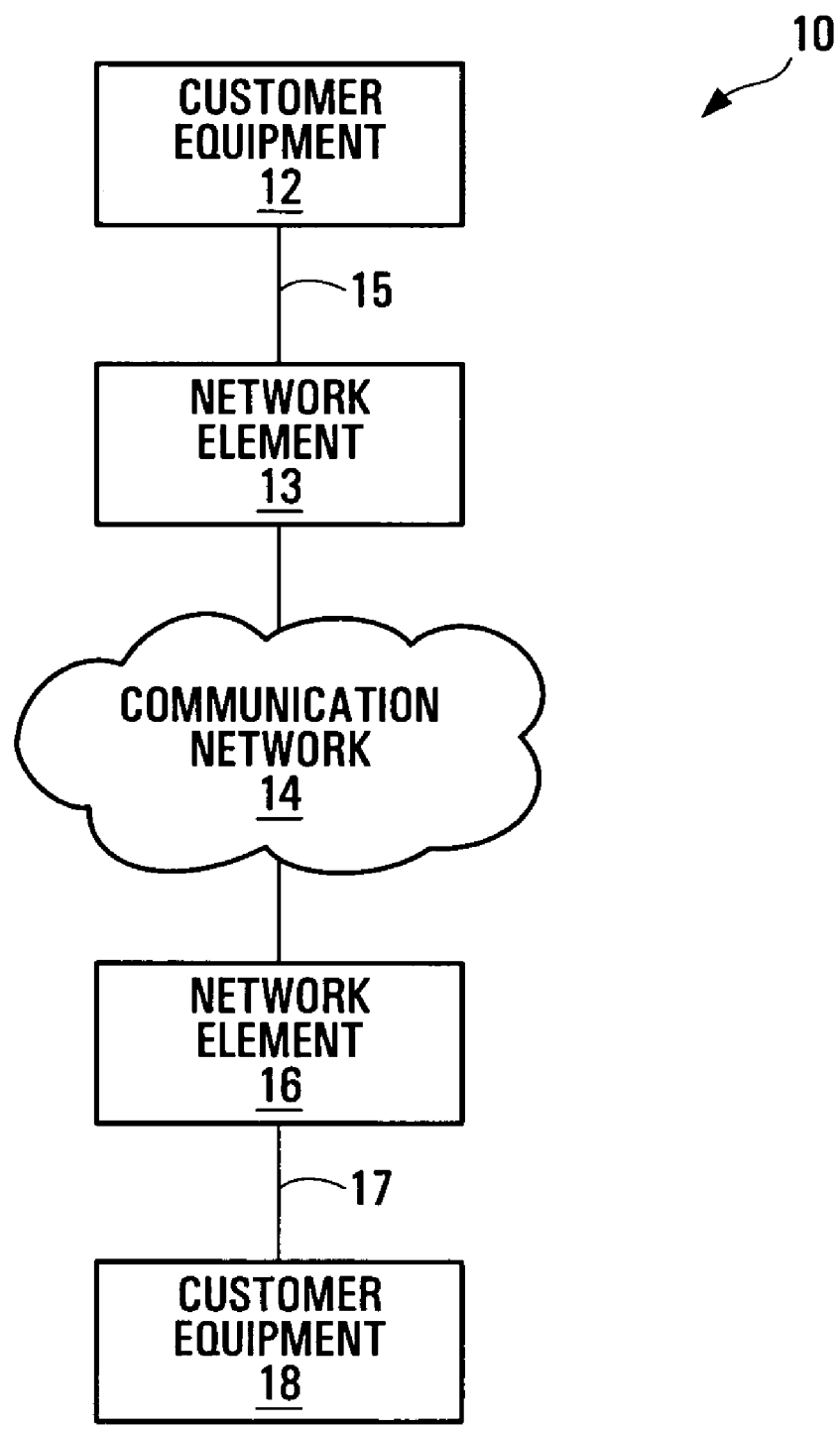
FIG. 1 is a block diagram of a communication system.

FIG. 1 is a block diagram of a communication system in which embodiments of the invention may be implemented. The communication system 10 in FIG. 1 includes customer communication equipment 12, 18, network elements 13, 16, and a communication network 14. Although many installations of customer equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The customer equipment 12, 18 represents communication equipment which exchanges communication traffic with the network elements 13, 16 over the connections 15, 17. The communication traffic transmitted by the customer equipment 12, 18 may be locally generated or received from one or more communication traffic sources. Where the customer equipment 12, 18 represents Internet Service Provider (ISP) equipment, for example, communication traffic may be received from end user computer systems (not shown) and transmitted to the network elements 13, 16 for transfer through the communication network 14. Although shown as being directly connected to the network elements 13, 16, by the connections 15, 17 it will be apparent that the customer equipment 12, 18 may communicate with the network elements 13, 16 through other intermediate components (not shown).

It should be appreciated that the connections 15, 17 represent multiple physical or logical connections, and not necessarily single physical communication lines or connections. For example, some types of wired and wireless physical connections may support multiple channels or logical connections, referred to herein primarily as communication links, each of which may be policed and managed in accordance with embodiments of the invention. A customer may also purchase bandwidth on multiple physical network connections. Each connection 15, 17 may therefore include a single line or connection which supports multiple communication links, or multiple connections which provide one or more respective communication links. References herein to communication links should thus be interpreted accordingly.

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14.

Many different types of customer, intermediate, and network communication equipment, as well as the operation thereof, will be apparent to those skilled in the art. In general, communication traffic originating with the customer equipment 12, 18, and possibly other sources of communication traffic, for transfer to a remote destination through the communication network 14 is received by a network element 13, 16, translated between different protocols or formats if necessary, and routed through the communication network 14. Asynchronous Transfer Mode (ATM), Synchronous Optical Network (SONET), and IP are illustrative examples of protocols in conjunction with which embodiments of the invention may be implemented. However, as will become apparent from the following description, embodiments of the invention are not limited to any particular types of communication equipment, transfer mechanisms, or protocols.

According to one embodiment, communication traffic policing is implemented at the network elements 13, 16 to enforce SLAs which are in place for the customer links 15, 17.

Figure 2:
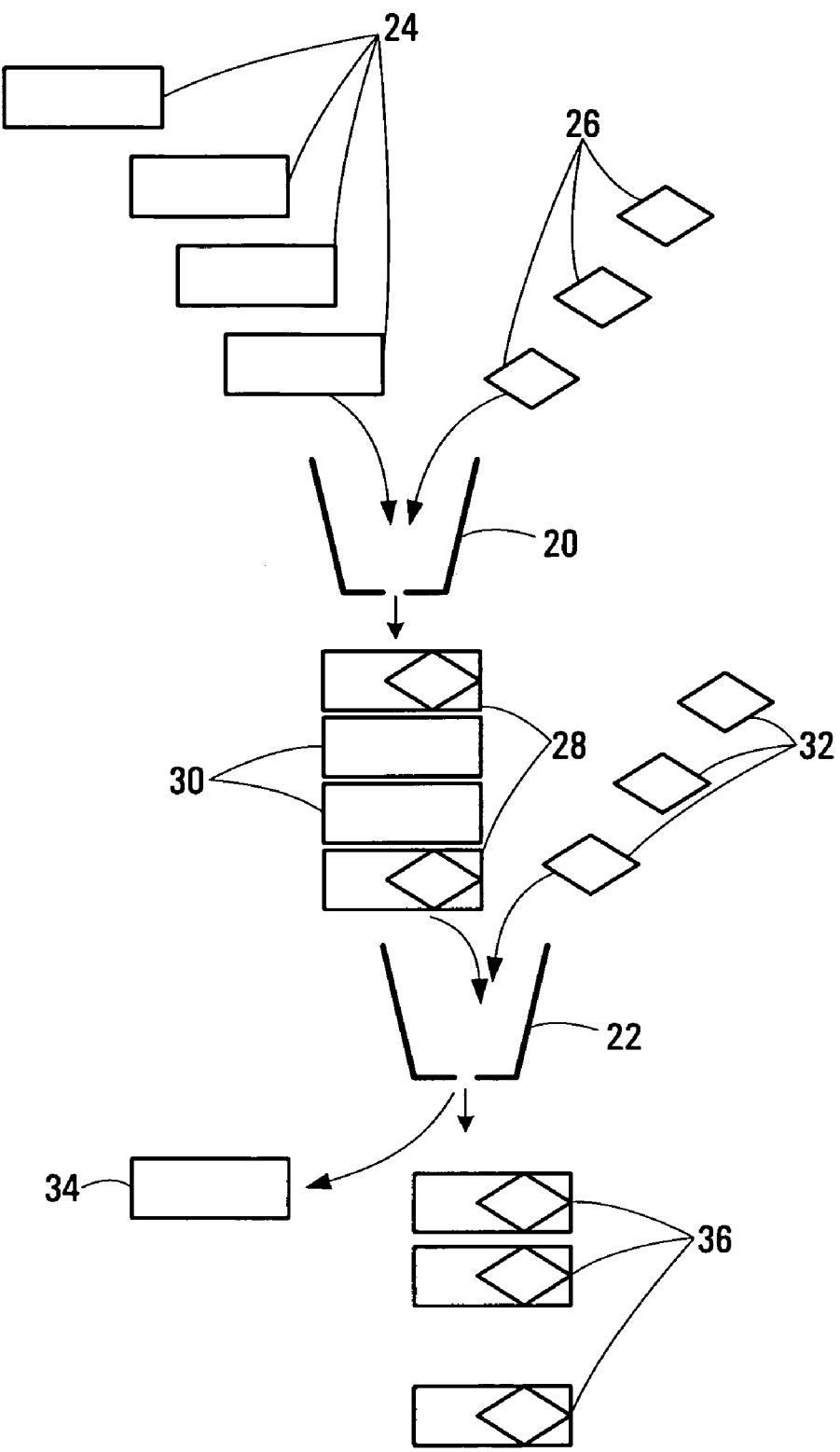
FIG. 2 is a block diagram representing a leaky bucket communication traffic policing technique.

As described above, known communication traffic policing techniques do not provide for sharing of excess available bandwidth between a group of communication links, illustratively a group of communication links on which a customer has purchased bandwidth. FIG. 2 is a block diagram representing a conventional leaky bucket communication traffic policing technique.

The use of single or dual leaky buckets to police network communication traffic on a per-connection basis is common in the communications industry. A typical dual leaky bucket approach is shown in FIG. 2.

Customer traffic enters the first bucket 20, which may enforce a peak communication traffic rate parameter for instance, as data blocks or units 24, illustratively packets. "Tokens" 26 are metered out and assigned to the packets 24 based on the SLA. Tokens are essentially a measure of bandwidth on an outgoing communication link on which the incoming customer traffic is to be transmitted. Depending on the rate of the incoming packets 24 and the availability of tokens 26, packets 24 may or may not receive a token 26, or there may not be a packet 24 available for a token 26 to be assigned to. Assigning of a token 26 to a packet 24 does not normally require that the packet be modified. A packet which receives a token is often simply passed by a traffic regulator to other components for further processing.

Packets then drain from the first bucket 20 into the second bucket 22, which might enforce a different communication traffic limitation such as sustained rate. As shown, some packets 28 draining from the bucket 20 are assigned tokens, whereas other packets 30 did not receive a token from the first bucket 20. The packets 30 have a second opportunity to receive a token 32 in the second bucket 22, in accordance with communication traffic limitations as defined in the SLA. After draining through the second bucket 22, any packets 34 which did not receive a token are discarded or marked for later discarding, and packets 36 which have received a token are output for further processing. This processing may include such operations as reformatting the packets if necessary, and transmitting the packets into the network 14 (FIG. 1) for example.

The leaky bucket approach shown in FIG. 2, according to conventional policing techniques, would be applied to each communication link on which bandwidth is purchased by a customer. The packet 34, which did not receive a token, would be discarded or marked for later discarding, even though another one of the customer's communication links might have spare capacity to accommodate the packet without exceeding its bandwidth allocation. Although in this case the customer's aggregate bandwidth can accommodate the packet 34, the packet 34 may be discarded simply due to the fact that customer traffic has not been more evenly distributed among the customer's communication links.

Figure 3:
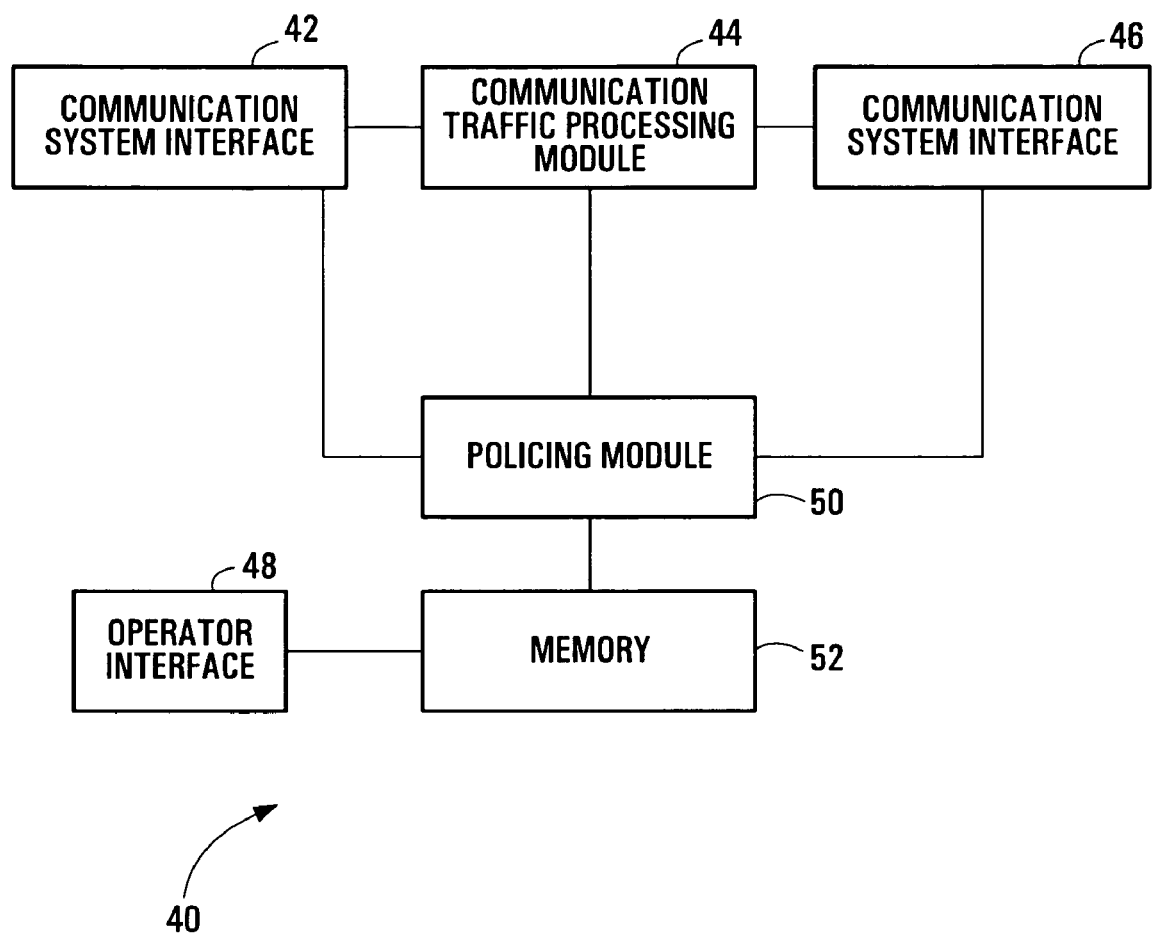
FIG. 3 is a block diagram of a communication device incorporating an apparatus of an embodiment of the invention.

Embodiments of the invention address the above problem. FIG. 3 is a block diagram of a communication device 40 which incorporates an apparatus of an embodiment of the invention. The communication device 40 includes communication system interfaces 42, 46, a communication traffic processing module 44 operatively coupled between the communication system interfaces 42, 46, an operator interface 48, a policing module 50 operatively coupled to the communication system interfaces 42, 46 and to the communication traffic processing module 44, and a memory 52 operatively coupled to the operator interface 48 and the policing module 50.

The communication system interfaces 42, 46 may include such components as transceivers and physical layer interfaces via which communication traffic may be exchanged with communication links. As those skilled in the art will appreciate, the particular structure of the interfaces 42, 46 will depend upon the communication system in which the device 40 is deployed.

For illustrative purposes, separate interfaces 42, 46 have been shown in FIG. 3 to represent a customer or access interface and a communication network interface. For example, the interface 42 may support communication links to customer equipment, whereas the interface 46 allows communication traffic to be transmitted and preferably received over a communication network. Policing in accordance with embodiments of the invention may also be more easily understood by considering a data path between separate interfaces as shown in FIG. 3. It should be appreciated, however, that the interfaces 42, 46 may be of the same or different types, and need not be provided as separate modules. As noted above, internal communication device structures may differ between communication systems and implementations.

Communication traffic processing functions, such as protocol conversion, formatting, routing, switching, and the like are performed by the communication traffic processing module 44. In many modern communication devices, the processing module 44 is implemented at least in part using a processor, illustratively a microprocessor, microcontroller, Application Specific Integrated Circuit (ASIC), or a Digital Signal Processor (DSP), which is configured to perform these functions by executing software. This processor may be a dedicated processor or a shared processor which performs other tasks in addition to communication traffic processing. Hardware-based communication traffic processing, using Field Programmable Gate Arrays (FPGAs) and other hardware components, as well as combined architectures in which functions are supported by both hardware and software, are also contemplated. As described above for the interfaces 42, 46, the particular functions and thus the structure of the communication traffic processing module 44 will be dependent upon the type of communication device 40, the particular functions it supports, and the communication system in which it is deployed.

The operator interface 48 represents an interface which allows an operator or other personnel to interact with the communication device 40. A remote Network Management System (NMS), for example, may communicate with the operator interface 48 through a communication link provided by one of the communication system interfaces 42, 46 or through a separate operations or control communication link. In this case, an operator may establish and modify configuration settings stored in the memory 52, and possibly other components of the communication device 40, from an NMS.

The policing module 50, like the communication traffic processing module 44, may be implemented using a processor and software, hardware, or some combination thereof. According to one embodiment, the policing module 50 incorporates, or is at least operatively coupled to, timers, such as counters, and comparators. The timers provide indications of communication traffic arrival times and current or elapsed time. Timing comparisons may then be made to examine communication traffic for conformance with SLAs, or more generally, communication traffic restrictions. Timing-based conformance determinations are described in further detail below with reference to FIG. 5.

Although the policing module 50 and the communication traffic processing module 44 are shown separately in FIG. 3, policing functions are integrated with communication traffic processing in some communication devices.

The memory 52 may include one or more memory devices. Many communication devices incorporate various types of solid state memory device, typically both volatile and non-volatile devices, for storing different types of information. The memory device 52 might also or instead include devices which use movable or removable storage media, such as disk drives. For the purposes of communication traffic policing, the memory 52 may be used to store communication traffic parameters and configuration information for policed communication links. It should be appreciated that the memory 52 may also store other information, including operating system software and software which supports the functions of the policing module 50 and the communication traffic processing module 44, for example.

Those skilled in the art will be familiar with many communication devices having a general structure as shown in FIG. 3. Switches, routers, and other types of communication network equipment are all examples of types of communication device which may police communication links for conformance with SLAs. In these types of communication device, the components shown in FIG. 3 may be provided on a circuit card, for example. Thus, a policing module may be provided in a substantially stand-alone communication device, or in a component, illustratively a circuit card, of a larger communication device. The invention is not restricted to implementation in communication network equipment, however, as other types of communication device may benefit from the policing techniques disclosed herein.

In operation, communication traffic received through one communication link may be processed by the communication traffic processing module 44 for output to a different communication link. For the purposes of illustration, it may be useful to consider an example of communication traffic being received via the interface 42 for switching and output for transmission via the interface 46 by the communication traffic processing module 44. This example is not intended to limit the present invention in any way, however, as communication traffic policing may provide benefits for other communication traffic processing scenarios. Communication traffic which is terminated by a communication device, for instance, would be processed locally but not transferred to an outgoing communication link. In this case, SLAs or other restrictions established for the received communication traffic may be enforced to control how much communication traffic is accepted by the communication device 40 for processing.

Continuing with the above illustrative example of communication traffic switching between the interfaces 42, 46 by the communication traffic processing module 44, the policing module 50 controls communication traffic transfer. Depending upon the type of implementation, the policing module 50 may have an active or passive role in the actual communication traffic transfer. In one embodiment, communication traffic is received by the policing module 50 and transferred to the communication traffic processing module 44 if it is compliant with communication traffic restrictions, as specified in SLAs for instance. According to another embodiment, the policing module 50 does not actually handle communication traffic, and instead controls another component which either passes compliant communication traffic or blocks non-compliant communication traffic. Communication traffic blocking may be accomplished, for example, by discarding non-compliant traffic or marking non-compliant traffic for later discarding.

The present invention is not dependent upon any particular communication traffic transfer mechanism used by the policing module 50 to allow or block communication traffic transfer, and thus references herein to transfer of policed communication traffic should be interpreted accordingly to include active and passive transfer mechanisms. Whether active or passive communication traffic transfer control is implemented is a matter of design choice. Those skilled in the art will be familiar with both types of policing and various possible implementations thereof.

In accordance with an aspect of the present invention, a multiple stage policing scheme is applied to communication traffic by the policing module 50. Whereas conventional policing mechanisms enforce communication traffic restrictions only on a per-link basis, the policing module 50 is configured, by hardware design or by executing software for instance, to enforce both per-link and group restrictions for communication links in a group.

As noted above, communication links on which a customer has purchased bandwidth may be configured into a group. This may be accomplished, for example, by an operator storing or modifying information stored in the memory 52 through the operator interface 48. In one possible embodiment, a group is configured by establishing group characteristics in the memory 52. Group characteristics might include such information as identifiers of communication links in a group and an aggregate group communication traffic transfer rate for the group as specified in SLAs for each link of the group. Communication links may be identified by physical interface identifier, a logical identifier, or some other type of identifier, examples of all of which will be apparent to those skilled in the art.

The policing module 50 then determines group members and characteristics by accessing the memory 52. When communication traffic is received on a particular communication link, for example, the policing module 50 may access the memory 52 using an identifier of the communication link to determine whether the communication link is part of a group and if so, the characteristics of that group.

Embodiments in which group characteristics are determined from per-link characteristics are also contemplated. For example, the policing module 50 may compute an aggregate group communication traffic transfer rate as the sum of maximum permitted per-link rates. Alternatively, an aggregate group rate need not necessarily be explicitly computed or stored. The policing module 50 may use per-link actual and maximum rates to determine whether excess bandwidth is available at any time for transferring additional communication traffic associated with communication links in a group.

Depending on the type of the communication links, traffic flows on the links may be established by an operator through an NMS and interaction with other components of the communication device 40. However, the present invention may be implemented in conjunction with virtually any types of communication links, regardless of the mechanisms by which such links are established.

In regard to per-link characteristics, these might also be stored in the memory 52 or otherwise accessible by the policing module 50. For an Asynchronous Transfer Mode (ATM) traffic flow, per-link characteristics are typically specified in terms of defined traffic parameters, including peak cell rate, cell delay variation, sustainable cell rate, and maximum burst size. Further or fewer ATM traffic parameters, or other parameters for different types of traffic, may be used to define per-link characteristics.

Per-link characteristics, which are communication traffic transfer rate restrictions in one embodiment, are enforced by the policing module 50 by allowing transfer of communication traffic associated with communication links of the group at transfer rates up to a maximum per-link transfer rate for each communication link. Different links may have different rate limitations, and thus respective rate limits may be enforced by the policing module 50.

Another stage of policing applied by the policing module 50 according to an aspect of the invention is group policing. If the current transfer rate of communication traffic associated with any communication links of the group would allow additional communication traffic to be accommodated without exceeding the respective per-link rate limits for those links, then the policing module 50 allows additional communication traffic, associated with other communication links of the group, to be transferred. In this manner, excess capacity on any communication links of the group can be used by other communication links in the group which would otherwise be discarding communication traffic. Although transfer of the additional communication traffic may effectively cause a communication link to exceed its allotted bandwidth, the aggregate group rate is still enforced by the policing module 50.

Regarding the actual transfer which takes place, any of several schemes may be implemented for transferring the additional communication traffic. For example, where the additional communication traffic is to be transmitted on its associated communication link, then it may be transferred to that communication link, even though the communication link would then be exceeding its allocated bandwidth. Excess bandwidth on some communication links thereby effectively compensates the overuse of bandwidth on other communication links. Alternatively, the additional communication traffic could be transferred to a communication link which has excess capacity available, as in token-based policing for instance. The communication traffic processing module 44 then transmits a packet toward its destination on another communication link. In this case, all communication links are kept within their allocated bandwidths.

As noted above, active or passive communication traffic transfer mechanisms may be used by the policing module 50 to allow communication traffic to be transferred, for example, between communication links provided by the interfaces 42, 46, or between an interface and another component of the communication device 40 which originates or terminates the communication traffic.

The policing module 50 may control the rates at which communication traffic received on communication links is accepted by the communication device 40 or the rates at which communication traffic is output to communication links for transmission from the communication device 40. In this sense, communication traffic may be considered to be associated with the communication links on which it is received or on which it is to be transmitted.

Policing of communication traffic flows in multiple directions is also contemplated. In a network element which provides access to a communication network element for instance, the policing module 50 preferably handles both ingress and egress traffic flows. Policed communication links may include network communication links, access communication links, or both.

Peak and sustained communication traffic rates are illustrative of per-link characteristics or restrictions which might be enforced by the policing module 50. A dual leaky bucket technique as shown in FIG. 2 and described above may be used by the policing module 50 to accomplish the per-link policing stage by allocating tokens to transmission data units of the communication traffic.

According to one embodiment of the invention, a third level of token assignment is introduced into a leaky bucket model to enable the sharing of unused bandwidth across a group of communication links. This type of implementation employs a new concept of a third shared bucket to police a group of communication links which are individually policed by leaky buckets, in an effort to share unused bandwidth from any communication links to any other communication links in that group.

Figure 4:
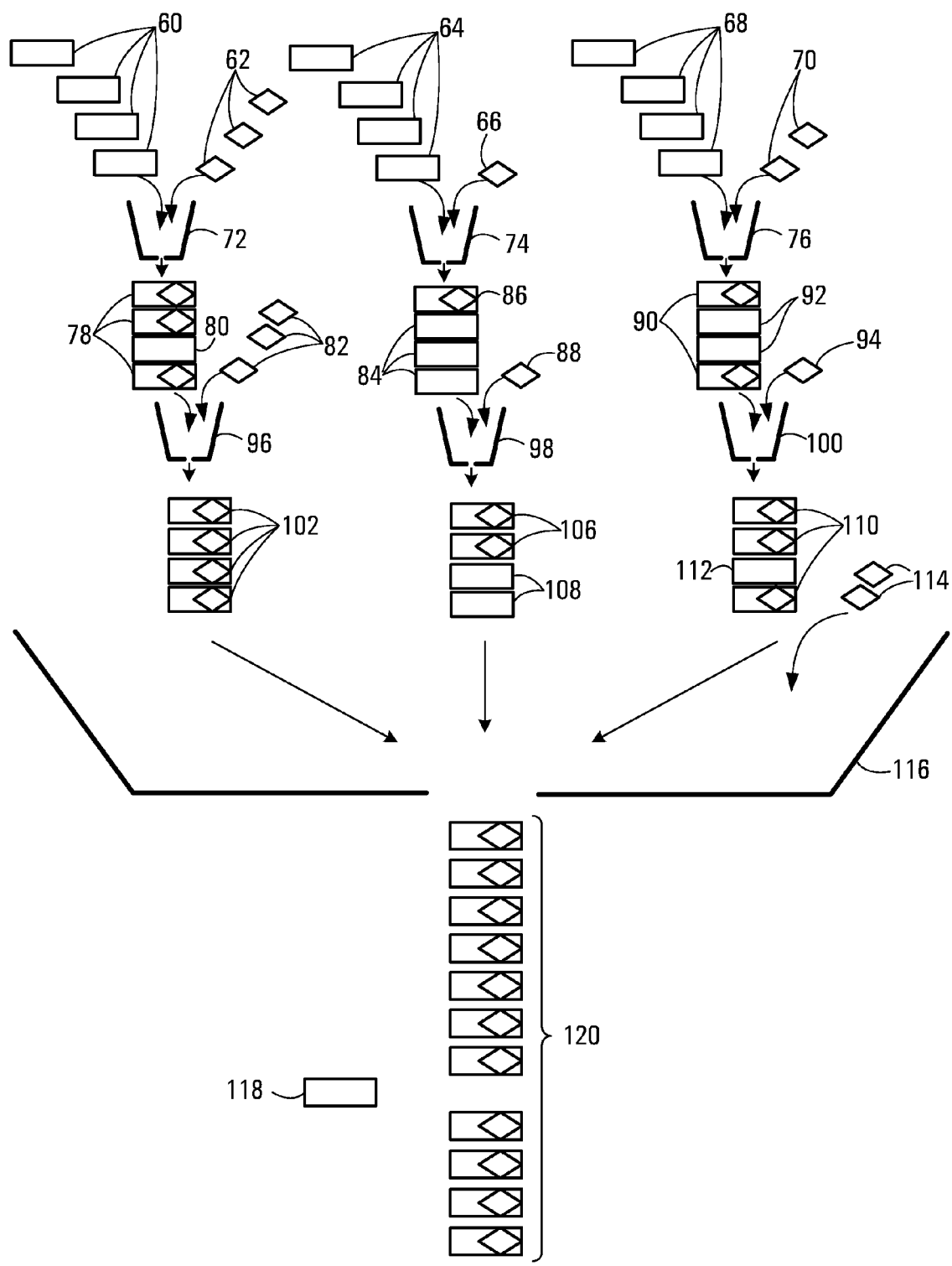
FIG. 4 is a block diagram of a leaky bucket communication traffic policing technique according to an embodiment of the invention.

FIG. 4 is a block diagram of a leaky bucket communication traffic policing technique according to an embodiment of the invention. As shown, the leaky bucket technique of FIG. 4 includes respective dual leaky buckets 72/96, 74/98, 76/100 for enforcing per-link restrictions, illustratively peak and sustained communication traffic rates. As described above with reference to FIG. 2, communication traffic 60, 64, 68, which may be packets for example, associated with respective communication links, enter a first level of the per-link buckets at 72, 74, 76, and available tokens 62, 66, 70 are assigned. Packets 78, 86, 90 which receive tokens and packets 80, 84, 92 which do not receive tokens drain into a second level of per-link leaky buckets 96, 98, 100 and have another opportunity to be assigned a token 82, 88, 94.

A new third, shared, group bucket 116 groups a number of individual per-link dual leaky buckets. Packets that drain out of each per-link dual leaky bucket chain enter the group bucket 116, where they have one last opportunity to receive a token 114. Some packets 102, 106, 110 may have been assigned tokens at the per-link phase, whereas other packets 108, 112 may still require tokens.

The tokens 114 are issued in a manner that differs from the per-link buckets. The tokens 114 are unused tokens from each of the per-link leaky buckets that drain into the group bucket 116. The group bucket 116 thus provides a means to share bandwidth from one connection to others in the same group. In the example shown in FIG. 4, two of the three tokens 82 available at the second level bucket 96 of one connection are not used by that connection, as only one incoming packet 80 requires a token. These excess tokens are available for assignment at the group policing stage implemented by the group bucket 116.

Any packets which have not been assigned a token in the group bucket 116 or one of the per-link buckets 72, 74, 76, 96, 98, 100, one of which is shown at 118, may be discarded, marked for later discarding, or subjected to other excess traffic processing. Packets which receive tokens, generally designated 120, are transferred for normal communication traffic processing and possibly transmission.

In a situation where all communication links are utilizing their maximum bandwidth according to their SLAs, the group bucket 116 does not receive any unused tokens 114 and no additional bandwidth is shared between communication links. However, if one or more communication links were to use less bandwidth, as shown for the leftmost communication link in FIG. 4, unused tokens 114 (two of the three tokens 82) are passed on to the group bucket 116 to be assigned to packets from other communication links that may be exceeding their respective predetermined bandwidth profiles. In a bursty traffic environment such as IP, this is often the case.

It should be noted that each communication link in FIG. 4 is still policed according to its original SLA. The group bucket 116 provides for sharing of unused bandwidth within the group of communication links.

Unused tokens 114 are preferably distributed by the group bucket 116 as they are received. The tokens 114 are preferably not stored, to thereby ensure that the overall aggregate group bandwidth is not exceeded.

Those skilled in the art will be familiar with many possible implementations of the leaky bucket policing technique shown in FIG. 4. In one embodiment, timers, which may be implemented as counters for instance, provide various timing indications on the basis of which determinations as to the availability of tokens may be made.

Figure 5:
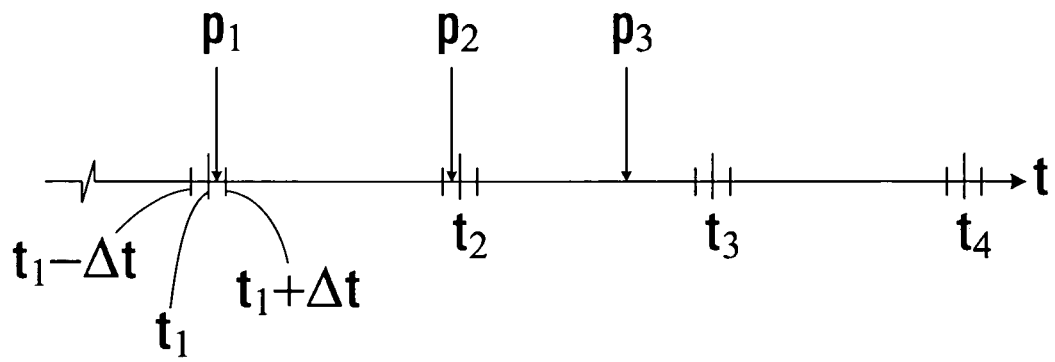
FIG. 5 is a timing diagram useful in further demonstrating operation of a leaky bucket policing technique.

FIG. 5 is a timing diagram useful in further demonstrating operation of a leaky bucket policing technique. Times at which communication traffic, illustratively packets, conforming to per-link communication traffic characteristics are expected are illustrated in FIG. 5 at $t_1$, $t_2$, $t_3$, and $t_4$. Packets arriving at the expected times are considered compliant, and allowed to be transferred or otherwise processed. Often, policing techniques provide for certain time margins within which an arriving packet will also be considered compliant. This time margin is shown in FIG. 5 as $\pm\Delta t$. By comparing the arrival time of a packet with an expected arrival time and possibly other timing indications such as an elapsed time since a compliant packet was previously received, a policing module can determine whether a packet should be assigned a token. Determinations as to whether an excess token is available may also be made based on timing comparisons.

In FIG. 5, the arrivals of three packets are shown at $p_1$, $p_2$, and $p_3$. Although packets $p_1$ and $p_2$ arrive after and before the expected times $t_1$ and $t_2$, respectively, these packets are within the allowed time margins of $t_1$ and $t_2$, and accordingly are compliant. In the case of packet $p_3$, however, this packet arrives before the allowed time margin for $t_3$, i.e., before $t_3 - \Delta t$. As the packet $p_3$ arrives sooner than it should, traffic on the policed communication link is arriving at a higher rate than it should and is therefore non-compliant. Packet $p_3$ is handled as a non-compliant packet, and may be discarded, marked, assigned an excess token from another communication link, or otherwise processed as described above. For the purposes of the leaky bucket technique of FIG. 4, one important point to note is that a token which was available for assignment to a compliant packet associated with one communication link at $t_3$ is made available for communication traffic associated with another communication link after the allowable time margin has elapsed, i.e., at time $t_3 + \Delta t$. Since a packet does not arrive within the allowable time margin of $t_4$, another token becomes available for re-assignment at $t_4 + \Delta t$.

The present invention is not restricted to implementation using the leaky bucket technique shown in FIG. 4, or to timing-based determinations as shown in FIG. 5. For example, some leaky bucket techniques might divert packets which have received tokens from entering subsequent buckets in a leaky bucket chain, such that only those packets requiring tokens enter each bucket level.

In addition, multiple packets draining into the group bucket 116, including packets 108 and 112, may contend for a token. Where more packets than tokens are available at the group bucket 116, the selection of which packet should get a token may be a simple first-come-first-served algorithm or a more sophisticated method where priorities or weights are assigned to communication traffic based on its associated communication link or traffic type so that they are given the unused bandwidth first. Priority for unused bandwidth may be specified during group configuration in some embodiments. Thus, although FIG. 4 shows an equal distribution of the tokens 114 between two communication links, with the packet 112 and only one of the packets 108 receiving the tokens 114, other distribution schemes are also contemplated. Selective distribution may also be implemented at any or all per-link buckets.

Leaky bucket policing should also be interpreted in its intended context, as an illustrative and non-limiting example of one possible implementation of policing according to an embodiment of the invention. Other similar or diverse techniques may be used to implement policing.

Figure 6:
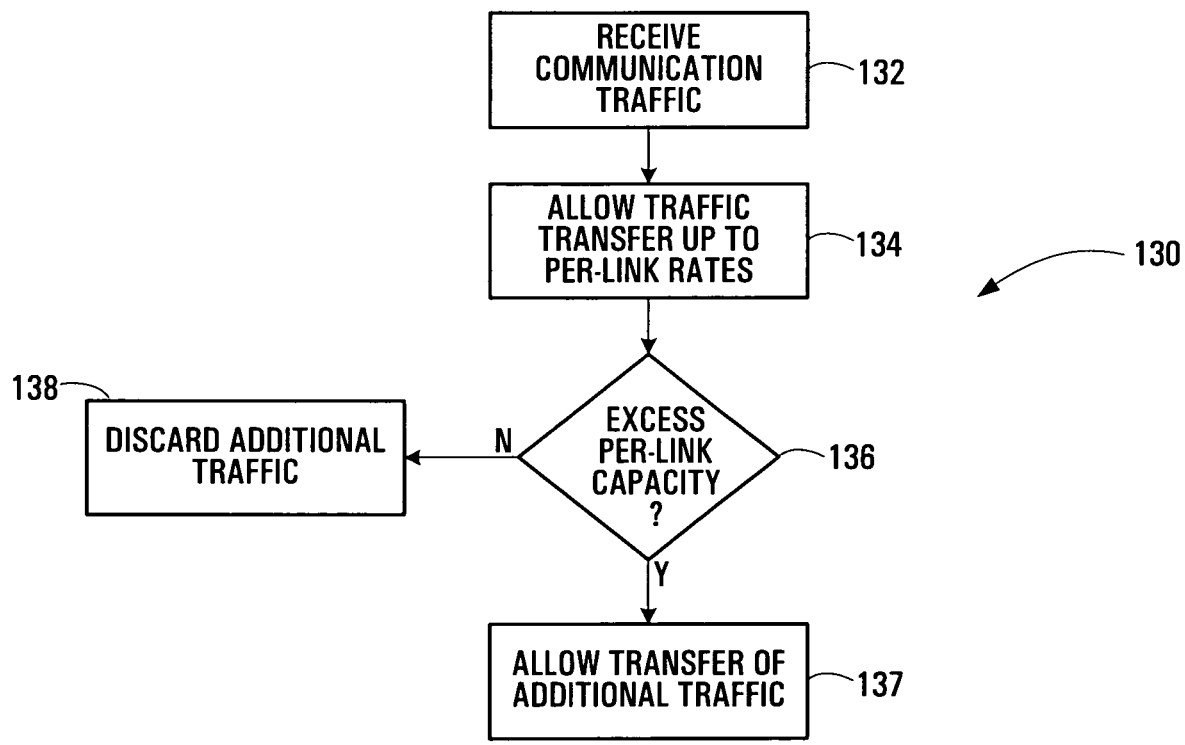
FIG. 6 is a flow diagram of a method according to an embodiment of the invention.

Embodiments of the invention have been described above primarily with reference to an apparatus or system. FIG. 6 is a flow diagram of a method according to another embodiment of the invention.

The method 130 begins at 132, with an operation of receiving communication traffic. The received communication traffic may include communication traffic which is received on communication links of a group or communication traffic which is to be transmitted on communication links of a group.

As shown at 134, transfer of communication traffic associated with the communication links is allowed at transfer rates up to respective per-link transfer rates, which in one embodiment correspond to purchased bandwidths as specified in SLAs. The operation at 134 represents a per-link policing stage.

A group policing stage involves determining whether excess per-link capacity is available on any of the communication links in the group, at 136. Transfer of additional communication traffic associated with one or more communication links of the group, above their respective per-link transfer rates, are allowed at 137 if other communication links in the group have excess capacity. The additional communication traffic transfer at 137 is allowed if a combined transfer rate of communication traffic associated with the communication links having excess capacity plus the additional communication traffic would not exceed the per-link transfer rate for the communication links on which excess capacity is available. In other words, some communication links may be allowed to effectively exceed their allocated bandwidth as long as other links have sufficient unused bandwidth.

If no excess capacity is available, or after excess capacity has also been exhausted, when all excess tokens have been assigned for instance, any additional traffic is discarded at 138. As will be apparent from the foregoing, discarding at 138 is one possible non-compliant traffic handling operation. Other non-compliant traffic processing mechanisms may be used instead of or in addition to discarding.

Communication traffic policing as disclosed herein enables a communication service provider to offer a feature which allows customers to share unused bandwidth between its own traffic flows or connections.

Embodiments of the invention provide a relatively simple implementation of a bandwidth sharing scheme for a group of connections that also ensures that a customer's purchased bandwidth is not shared with other customers. A simpler implementation also results in lower associated costs for providing bandwidth sharing features.

Bandwidth sharing in accordance with an aspect of the invention is performed at the policing stage, so that customer traffic which conforms to an aggregate bandwidth profile is not negatively affected, when transferred through a network for instance.

This bandwidth sharing is a value added feature for any network communications, and potentially for non-network communications. A service provider could offer this bundling of communication links and sharing of unused bandwidth as a service to its customers. The end customer would benefit from this service, as it would enable higher communication traffic throughput in certain traffic conditions by allowing redistribution and sharing of any unused bandwidth, which otherwise would have been lost, from one communication link to another.

What has been described is merely illustrative of the application of principles of the invention. Other arrangements and methods can be implemented by those skilled in the art without departing from the scope of the present invention.

For example, enforced communication traffic characteristics have been described above primarily as restrictions. These characteristics, and the related policing techniques, can equivalently be viewed as permissive, in the sense of permitting certain levels of traffic to flow on communication links and groups. References to allowing, blocking, and similar communication traffic control operations should be interpreted accordingly.

Packets have been described above solely for illustrative purposes. It should be appreciated that embodiments of the invention may be implemented in conjunction with other types of transmission data units, often also referred to as protocol data units (PDUs).

Some embodiments of the invention may support multiple groups of communication links, each group having corresponding group characteristics which are enforced as disclosed herein. Group characteristics may be common between groups, although in most implementations, it is expected that distinct groups would be configured with different group characteristics.

In addition, although described primarily in the context of methods and systems, other implementations of the invention are also contemplated, as instructions stored on a machine-readable medium, for example.

I claim:

1. An apparatus for enforcing communication traffic restrictions for a group of communication links, the apparatus comprising:
a communication traffic processor for executing modules and an associated memory for storing instructions for said modules, said modules comprising a communication traffic policing module configured to allow transfer of communication traffic associated with respective communication links of the group at transfer rates up to respective per-link transfer rates for the communication links by assigning per-link tokens to communication traffic transmission data units that are associated with the communication links and are received at respective expected times, and to allow transfer of additional communication traffic associated with a communication link of the group, above the per-link transfer rate for the communication link, where a combined transfer rate of communication traffic associated with the communication links of the group would not exceed a maximum aggregate transfer rate for the group, by assigning a per-link token for one of the communication links of the group, which token remains unused and becomes available for assignment to a communication traffic transmission data unit associated with another communication link of the group where no communication traffic transmission data unit associated with the one of the communication links is received at the expected time for the one of the communication links, to another communication traffic transmission data unit to which no per-link token has been assigned, and by discarding the unused per-link token where no other communication traffic transmission data unit to which to assign the unused per-link token is available when the unused token becomes available for assignment to a communication traffic transmission data unit associated with another communication link of the group.

2. The apparatus of claim 1, wherein communication traffic associated with a communication link comprises communication traffic which is received on the communication link or is to be transmitted on the communication link.

3. The apparatus of claim 1, wherein each per-link transfer rate comprises at least one of: a peak communication traffic rate and a sustained communication traffic rate.

4. The apparatus of claim 3, wherein each per-link transfer rate comprises peak and sustained communication traffic rates, and wherein the communication traffic policing module is configured to allow transfer of communication traffic which conforms to the peak and sustained communication traffic rates of the communication link with which the communication traffic is associated.

5. The apparatus of claim 1, wherein each per-link token allows a transmission data unit of the communication traffic to be transferred.

6. The apparatus of claim 1, further comprising:
an operator interface for configuring a plurality of communication links to form the group.

7. The apparatus of claim 1, wherein the communication traffic policing module is further configured to select, from a plurality of communication links of the group, the communication link for which to allow the transfer of the additional communication traffic.

8. Communication equipment comprising:
the apparatus of claim 1; and
communication system interfaces, operatively coupled to the communication link policing module, for exchanging communication traffic with a plurality of communication links.

9. The apparatus of claim 1, further comprising:
communication link interfaces for connection to a plurality of communication links including the group of communication links,
wherein the communication traffic policing module is configured to allow transfer of communication traffic and to allow transfer of additional communication traffic by applying a multi-stage policing scheme, the multi-stage policing scheme comprising a per-link policing stage for enforcing the respective per-link transfer rates for the communication links of the group and a group policing stage for enforcing the maximum aggregate transfer rate for the group.

10. The apparatus of claim 9, wherein the policing module applies the multi-stage policing scheme according to a multi-level leaky bucket technique, the multi-level leaky bucket technique comprising respective per-link leaky buckets configured to drain into a group leaky bucket.

11. The apparatus of claim 10, wherein the per-link transfer rates comprise at least one of peak and sustained communication traffic rates, and wherein the per-link leaky buckets comprise respective leaky buckets for enforcing the at least one of the peak and sustained communication traffic rates of each of the communication links of the group.

12. The apparatus of claim 9, further comprising:
a plurality of timers, operatively coupled to the policing module, for providing timing indications,
wherein the policing module is configured to determine whether communication traffic transmission data units are received at the respective expected times by comparing timing indications provided by the timers.

13. The apparatus of claim 9, wherein the policing module is further configured to transfer communication traffic which satisfies the per-link or group transfer rates between the communication link interfaces.

14. A method of policing a group of communication links at a communication device having a communication traffic processor for executing modules and an associated memory for storing instructions for said modules, said modules comprising a policing module, the method comprising:

the policing module allowing a communication traffic processing module of the communication device to transfer of communication traffic associated with respective communication links of the group at transfer rates up to respective per-link transfer rates for the communication links by assigning per-link tokens to communication traffic transmission data units that are associated with the communication links and are received by the communication device at respective expected times;

the policing module allowing the communication traffic processing module to transfer additional communication traffic associated with a communication link of the group, above the per-link transfer rate for the communication link, where a combined transfer rate of communication traffic associated with the communication links of the group would not exceed a maximum aggregate transfer rate for the group, by assigning a per-link token for one of the communication links of the group, which token remains unused and becomes available for assignment to a communication traffic transmission data unit associated with another communication link of the group where no communication traffic transmission data unit associated with the one of the communication links is received at the expected time for the one of the communication links, to another communication traffic transmission data unit to which no per-link token has been assigned, and by discarding the unused per-link token where no other communication traffic transmission data unit to which to assign the unused per-link token is available when the unused token becomes available for assignment to a communication traffic transmission data unit associated with another communication link of the group.

15. The method of claim 14, wherein the communication traffic comprises communication traffic which is received on the communication links or is to be transmitted on the communication links.

16. The method of claim 14, wherein each per-link transfer rate comprises peak and sustained communication traffic rates, and wherein the policing module allows the communication traffic processing module to transfer communication traffic at transfer rates up to the respective per-link transfer rates by assigning the per-link tokens to the transmission data units according to a dual leaky bucket technique.

17. The method of claim 14, further comprising:
configuring, through an operator interface of the communication device, a plurality of communication links to form the group.

18. The method of claim 17, wherein the plurality of communication links comprises communication links on which communication bandwidth has been purchased by a customer.

* * * * *

UNITED STATES PATENT AND TRADEMARK OFFICE
CERTIFICATE OF CORRECTION

PATENT NO. : 7,609,634 B2  Page 1 of 1
APPLICATION NO. : 11/086535
DATED : October 27, 2009
INVENTOR(S) : Joey M. W. Chow It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Twelfth Day of October, 2010

David J. Kappos
*Director of the United States Patent and Trademark Office*